United States Patent
Lee et al.

(10) Patent No.: US 12,351,665 B2
(45) Date of Patent: Jul. 8, 2025

(54) GRAFT COPOLYMER, METHOD FOR PREPARING THE SAME, AND RESIN COMPOSITION INCLUDING THE SAME

(71) Applicant: LG CHEM, LTD., Seoul (KR)

(72) Inventors: Kwang Jin Lee, Daejeon (KR); Ki Hyun Yoo, Daejeon (KR); Yoon Ho Kim, Daejeon (KR); Sang Il Nam, Daejeon (KR); Kyung Bok Sun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 751 days.

(21) Appl. No.: 17/625,190

(22) PCT Filed: Mar. 29, 2021

(86) PCT No.: PCT/KR2021/003838
§ 371 (c)(1),
(2) Date: Jan. 6, 2022

(87) PCT Pub. No.: WO2021/230492
PCT Pub. Date: Nov. 18, 2021

(65) Prior Publication Data
US 2022/0259358 A1   Aug. 18, 2022

(30) Foreign Application Priority Data
May 14, 2020 (KR) .................. 10-2020-0057753

(51) Int. Cl.
C08F 279/02 (2006.01)
C08L 27/06 (2006.01)

(52) U.S. Cl.
CPC ............ *C08F 279/02* (2013.01); *C08L 27/06* (2013.01)

(58) Field of Classification Search
CPC ............................ C08F 279/02; C08F 220/58
See application file for complete search history.

(56) References Cited

U.S. PATENT DOCUMENTS

| | | | |
|---|---|---|---|
| 6,323,279 B1 | 11/2001 | Guntherberg et al. | |
| 6,730,741 B1 | 5/2004 | Honda et al. | |
| 2014/0378576 A1* | 12/2014 | Jung | C08F 285/00 525/243 |
| 2017/0226050 A1* | 8/2017 | Voronov | C09D 133/24 |
| 2018/0052269 A1 | 2/2018 | Saito et al. | |
| 2019/0248735 A1 | 8/2019 | Voronov et al. | |

FOREIGN PATENT DOCUMENTS

| | | | |
|---|---|---|---|
| CN | 1357025 A | | 7/2002 |
| CN | 107430231 A | | 12/2017 |
| CN | 107964069 | * | 4/2018 |
| JP | H01-297402 A | | 11/1989 |
| JP | H07-228643 A | | 8/1995 |
| JP | 2000-072836 A | | 3/2000 |
| JP | 2002-510349 A | | 4/2002 |
| JP | 2002-196543 A | | 7/2002 |
| JP | 2009-254315 A | | 11/2009 |
| JP | 2016-138313 A | | 8/2016 |
| KR | 10-2012-0024231 A | | 3/2012 |
| KR | 10-2013-0090734 A | | 8/2013 |
| KR | 10-2014-0147655 A | | 12/2014 |
| KR | 10-2015-0030847 A | | 3/2015 |
| KR | 10-2018-0033653 A | | 4/2018 |
| KR | 10-2019-0064989 A | | 6/2019 |
| WO | 2016/022960 A2 | | 2/2016 |

OTHER PUBLICATIONS

Translation of CN107964069 (Year: 2018).*
Kirianchuk et al., "Kinetics and mechanism of free-radical polymerization reaction of acrylic monomers based on triglycerides of plant oils," Dopovidi Natsional'noi Akademii Nauk Ukraini, 3: 95-103 (2018) (see English abstract).
International Search Report issued in corresponding International Patent Application No. PCT/KR2021/003838 dated Jul. 6, 2021.
Office Action issued Sep. 26, 2023 for orresponding Chinese Patent Application No. 202180004584.8.
Office Action issued in corresponding Japanese Patent Application No. 2021-576397, dated Jan. 5, 2023.

* cited by examiner

*Primary Examiner* — Robert C Boyle
(74) *Attorney, Agent, or Firm* — Morgan, Lewis & Bockius LLP

(57) ABSTRACT

Disclosed is a graft copolymer, and a graft copolymer including a rubbery polymer, wherein the rubbery polymer includes a conjugated diene-based monomer unit, and one or more compound units selected from the group consisting of compounds represented by Formula 1, wherein the graft copolymer includes an alkyl (meth)acrylate-based monomer unit and an aromatic vinyl-based monomer unit, the content of the one or more compound units selected from the group consisting of the compounds represented by Formula 1 is from 0.1 wt % to 5.0 wt % with respect to the graft copolymer, the alkyl (meth)acrylate-based monomer unit is crosslinked from a crosslinking agent, and a weight average molecular weight of the aromatic vinyl-based monomer unit is from 20,000 g/mol to 100,000 g/mol. Also disclosed is a method for preparing a graft copolymer and a resin composition including same.

[Formula 1]

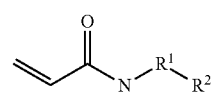

10 Claims, No Drawings

GRAFT COPOLYMER, METHOD FOR PREPARING THE SAME, AND RESIN COMPOSITION INCLUDING THE SAME

CROSS-REFERENCE TO RELATED APPLICATIONS

The present application claims the benefit of priority based on Korean Patent Application No. 10-2020-0057753, filed on May 14, 2020, the entire contents of which are incorporated herein by reference.

TECHNICAL FIELD

The present invention relates to a graft copolymer, and to a graft copolymer having excellent impact resistance as an impact reinforcing agent with respect to a vinyl chloride-based resin and excellent dispersibility with respect to a vinyl chloride-based resin, a method for preparing the same and a resin composition including the same.

BACKGROUND ART

Vinyl chloride-based resins are cheap, are easy to control hardness, have various application fields, have excellent physical properties and chemical properties, and are widely used in various fields. However, the vinyl chloride-based resins themselves have structurally inferior impact resistance, processing liquidity, heat resistant deformation, etc., and for commercialization, the use of additives for supplementing the defects of the vinyl chloride-based resins is essential, and among them, an impact reinforcing agent is necessary.

As the impact reinforcing agent available in the vinyl chloride-based resin, a butadiene-based impact reinforcing agent such as an acrylonitrile-butadiene-styrene (ABS)-based and an methylmethacrylate-butadiene-styrene (MBS)-based impact reinforcing agent, and a thermoplastic polymer-based impact reinforcing agent such as a silicone-based reinforcing agent and chlorinated polyethylene (CPE) may be used. Among them, the butadiene-based impact reinforcing agent is most commonly used. Particularly, in products requiring low-temperature impact resistance, the methylmethacrylate-butadiene-styrene (MBS)-based impact reinforcing agent is mostly used.

Recently, the butadiene-based impact reinforcing agent is mostly used for the usage of interior, deco sheet and flooring materials of building structures, and according to the purpose of use, dispersibility during processing, adhesion in a roll mill, and thermal stability are required as well as impact strength.

PRIOR ART DOCUMENT

Patent Document (Patent Document 1) KR10-2012-0024231A

DISCLOSURE OF THE INVENTION

Technical Problem

A task for solving of the present invention is to improve the impact resistance and dispersibility simultaneously of a graft copolymer which is used as an impact reinforcing agent for a vinyl chloride-based resin.

Accordingly, an object of the present invention is to provide a graft copolymer having excellent impact resistance as an impact reinforcing agent for a vinyl chloride-based resin and having excellent dispersibility with respect to a vinyl chloride resin.

In addition, another object of the present invention is to provide a resin composition including the graft copolymer as an impact reinforcing agent and having excellent impact resistance and fish-eye properties.

Technical Solution

In order to solve the above-described tasks, the present invention provides a graft copolymer including a rubbery polymer, wherein the rubbery polymer includes a conjugated diene-based monomer unit, and one or more compound units selected from the group consisting of compounds represented by the following Formula 1, the graft copolymer includes an alkyl (meth)acrylate-based monomer unit and an aromatic vinyl-based monomer unit, the amount of the one or more compound units selected from the group consisting of the compounds represented by Formula 1 is from 0.1 wt % to 5.0 wt % with respect to the graft copolymer, the alkyl (meth)acrylate-based monomer unit is crosslinked from a crosslinking agent, and a weight average molecular weight of the aromatic vinyl-based monomer unit is from 20,000 g/mol to 100,000 g/mol:

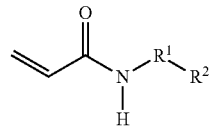

[Formula 1]

in Formula 1,
$R^1$ is an alkylene group of 1 to 10 carbon atoms, and
$R^2$ is a saturated or unsaturated fatty acid ester group of 10 to 20 carbon atoms.

In addition, the present invention provides a method for preparing a graft copolymer including: injecting and polymerizing a conjugated diene-based monomer and one or more compounds selected from the group consisting of compounds represented by the following Formula 1 to prepare a rubbery polymer latex (S10); injecting an alkyl (meth) acrylate monomer and a crosslinking agent to the rubbery polymer latex prepared in step (S10) and polymerizing to prepare a preliminary graft copolymer latex (S20); and injecting an aromatic vinyl monomer to the preliminary graft copolymer latex prepared in step (S20) and polymerizing to prepare a graft copolymer latex (S30), wherein the compound represented by Formula 1 is injected in 0.1 wt % to 5 wt % in step (S10) based on a total amount of the monomer, the compound represented by Formula 1 and the crosslinking agent, and step (S30) is performed by non-initiator polymerization by which a polymerization initiator is not injected:

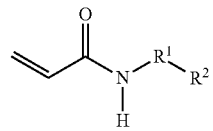

[Formula 1]

in Formula 1,
$R^1$ is an alkylene group of 1 to 10 carbon atoms, and
$R^2$ is a saturated or unsaturated fatty acid ester group of 10 to 20 carbon atoms.

In addition, the present invention provides a resin composition including the graft copolymer, and a vinyl chloride-based resin.

Advantageous Effects

In the case of applying the graft copolymer of the present invention in a vinyl chloride-based resin as an impact reinforcing agent, the impact strength of the resin composition may be excellent, and effects of improving fish-eye properties according to the improvement of dispersibility may be achieved.

BEST MODE FOR CARRYING OUT THE INVENTION

Hereinafter, the present invention will be described in more detail to assist the understanding of the present invention.

It will be understood that words or terms used in the description and claims of the present invention shall not be interpreted as the meaning defined in commonly used dictionaries. It will be understood that the words or terms should be interpreted as having a meaning that is consistent with their meaning in the technical idea of the invention, based on the principle that an inventor may properly define the meaning of the words to best explain the invention.

The term "monomer unit" in the present invention may represent a component or a structure derived from the monomer or the material itself, and in a particular embodiment, may mean a repeating unit formed in the polymer during polymerizing a polymer through the participation of the monomer injected in polymerization reaction.

The term "composition" used in the present invention includes a reaction product and a decomposition product formed from the materials of a corresponding composition as well as a mixture of materials including the corresponding composition.

The present invention provides a graft copolymer which may be used as an impact reinforcing agent.

The graft copolymer according to an embodiment of the present invention is a graft copolymer including a rubbery polymer, wherein the rubbery polymer includes a conjugated diene-based monomer unit, and one or more compound units selected from the group consisting of compounds represented by Formula 1 below, the graft copolymer includes an alkyl (meth)acrylate-based monomer unit and an aromatic vinyl-based monomer unit, the amount of the one or more compound units selected from the group consisting of the compounds represented by Formula 1 is from 0.1 wt % to 5.0 wt % with respect to the graft copolymer, the alkyl (meth)acrylate-based monomer unit is crosslinked from a crosslinking agent, and a weight average molecular weight of the aromatic vinyl-based monomer unit is from 20,000 g/mol to 100,000 g/mol.

[Formula 1]

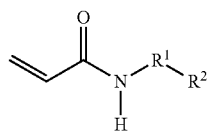

In Formula 1, $R^1$ is an alkylene group of 1 to 10 carbon atoms, and $R^2$ is a saturated or unsaturated fatty acid ester group of 10 to 20 carbon atoms.

According to an embodiment of the present invention, in Formula 1, $R^2$ may be represented by Formula 2 below.

[Formula 2]

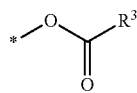

In Formula 2, $R^3$ is a saturated or unsaturated monovalent hydrocarbon group of 9 to 19, 11 to 17, or 15 to 17 carbon atoms.

In a particular embodiment, in Formula 1, $R^1$ may be an alkylene group of 1 to 10, 1 to 5, or 1 to 3 carbon atoms, and $R^2$ may be a stearate group, a palmitate group, an oleate group or a linoleate group.

In a more particular embodiment, the compound represented by Formula 1 may be compounds represented by Formulae 1-1 to 1-4 below.

[Formula 1-1]

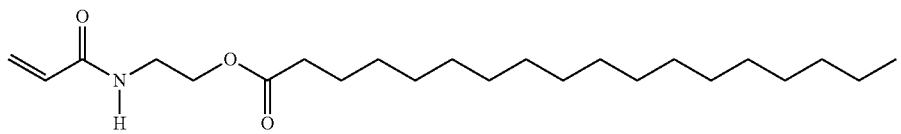

[Formula 1-2]

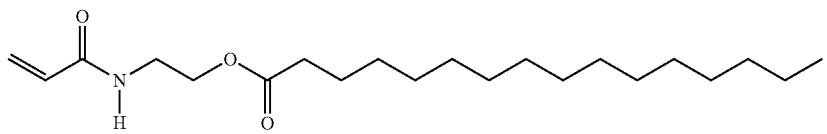

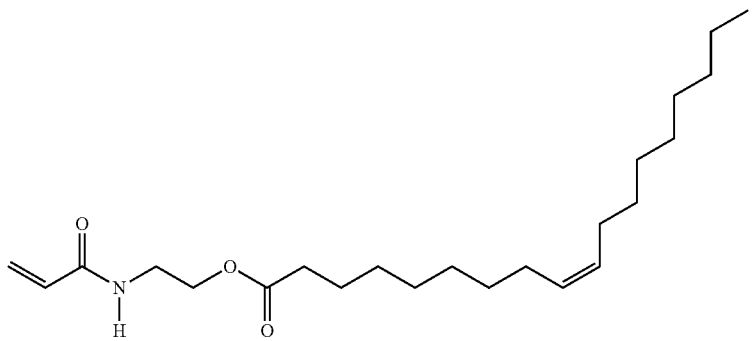

[Formula 1-3]

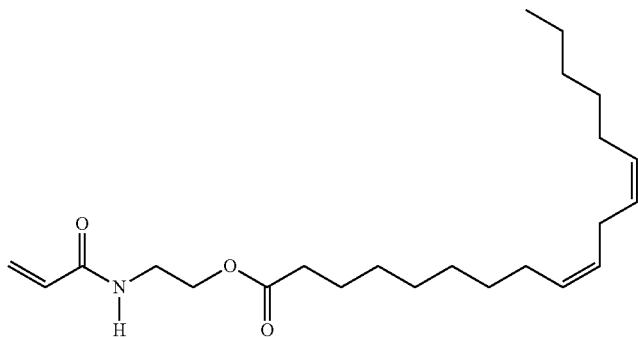

[Formula 1-4]

In the graft copolymer according to the present invention, from the one or more compound units selected from the group consisting of the compounds represented by Formula 1 included in the rubbery polymer, the degree of crosslinking and gel content of the rubbery polymer may be optimized, and the improvement of impact resistance by the rubbery polymer may be maximized. If the rubbery polymer does not directly include one or more compound units selected from the group consisting of the compounds represented by Formula 1 but includes only a saturated or unsaturated fatty acid ester, during processing a resin composition, the saturated or unsaturated fatty acid ester may be, of course, discharged to deteriorate the physical properties of the resin composition, and defects of deteriorating processability may be generated.

In addition, according to an embodiment of the present invention, the amount of one or more compound units selected from the group consisting of the compounds represented by Formula 1 may be from 0.1 wt % to 5.0 wt %, 0.1 wt % to 3.0 wt %, or 0.5 wt % to 1.5 wt % based on the graft copolymer, and within this range, the gel content and swelling index of the rubbery polymer may be controlled to optimized ranges during preparing the graft copolymer, and the improvement of the impact resistance by the rubbery polymer may be maximized.

According to an embodiment of the present invention, the conjugated diene-based monomer unit is for providing the graft copolymer with impact resistance, and the conjugated diene-based monomer forming the conjugated diene-based monomer unit may be one or more selected from the group consisting of 1,3-butadiene, 2,3-dimethyl-1,3-butadiene, piperylene, 3-butyl-1,3-octadiene, isoprene and 2-phenyl-1,3-butadiene, particularly, 1,3-butadiene.

According to an embodiment of the present invention, the amount of the conjugated diene-based monomer unit may be 50 wt % to 80 wt %, 60 wt % to 80 wt %, or 70 wt % to 80 wt % based on the graft copolymer, and within this range, effects of excellent impact resistance may be achieved.

In addition, according to an embodiment of the present invention, the rubbery polymer may include a crosslinkable monomer unit. The crosslinkable monomer is a comonomer for easily performing polymerization during polymerizing the rubbery polymer, and may be one or more selected from the group consisting of a (meth)acrylic crosslinkable monomer such as ethylene glycol di(meth)acrylate, 1,6-hexanediol di(meth)acrylate, allyl (meth)acrylate, trimethylolpropane tri(meth)acrylate and pentaerythritol tetra(meth)acrylate; and a vinyl-based crosslinkable monomer such as divinylbenzene, divinylnaphthalene and diallyl phthalate, particularly, divinylbenzene.

According to an embodiment of the present invention, the amount of the crosslinkable monomer unit may be 0.01 wt % to 5.00 wt %, 0.1 wt % to 3.0 wt %, or 0.1 wt % to 1.0 wt %, and within this range, the degree of crosslinking and gel content of the rubbery polymer may be controlled, and effects of excellent impact strength may be achieved.

According to an embodiment of the present invention, when immersing the rubbery polymer in toluene for 24 hours, the gel content may be 85 wt % to 98 wt %, 85 wt % to 95 wt %, or 90 wt % to 95 wt %, and a swelling index may be 7 to 16, 10 to 15, or 11 to 13, and within these ranges, the degree of crosslinking and gel content of the rubbery polymer may be optimized, and the improvement of impact resistance by the rubbery polymer may be maximized.

According to an embodiment of the present invention, the amount of the rubbery polymer may be 50 wt % to 80 wt %, 60 wt % to 80 wt %, or 70 wt % to 80 wt % based on the graft copolymer, and within this range, effects of the excellent impact strength and fish-eye properties of a resin composition including the graft copolymer as an impact reinforcing agent may be achieved.

According to an embodiment of the present invention, the average particle diameter of the rubbery polymer may be 180 nm to 220 m nm, 185 nm to 215 nm, or 190 nm to 210 nm, and within this range, effects of the excellent impact strength and fish-eye properties of a resin composition including the graft copolymer as an impact reinforcing agent may be achieved.

In addition, since the graft copolymer according to the present invention includes an alkyl (meth)acrylate-based monomer unit, which is crosslinked from a crosslinking agent, effects of improving dispersibility in a resin composition may be achieved.

According to an embodiment of the present invention, the alkyl (meth)acrylate-based monomer unit is for improving compatibility with a vinyl chloride-based resin, and the alkyl (meth)acrylate-based monomer forming the alkyl (meth)acrylate-based monomer unit may be an alkyl (meth)acrylate-based monomer of 1 to 12 carbon atoms. In a particular embodiment, the alkyl (meth)acrylate-based monomer unit may include a methyl (meth)acrylate monomer unit and one or more monomer units selected from the group consisting of alkyl (meth)acrylate monomers of 2 to 12 carbon atoms, more particularly, may be methyl methacrylate and one or more monomer units selected from the group consisting of alkyl acrylates of 2 to 12 carbon atoms.

According to an embodiment of the present invention, in the case where the alkyl (meth)acrylate-based monomer unit includes a methyl (meth)acrylate-based monomer unit and one or more monomer units selected from the group consisting of alkyl (meth)acrylate-based monomers of 2 to 12 carbon atoms, the weight ratio of the methyl (meth)acrylate-based monomer unit and the one or more monomer units selected from the group consisting of and alkyl (meth)acrylate-based monomers of 2 to 12 carbon atoms may be 5 to 20:1, 5 to 15:1, or 8 to 12:1, and within this range, the high reactivity of the methyl (meth)acrylate-based monomer may be controlled, and at the same time, the alkyl (meth)acrylate-based monomer unit of 2 to 12 carbon atoms may be formed between the methyl (meth)acrylate-based monomer units, and the graft layer of a graft copolymer having a uniform molecular weight may be achieved.

According to an embodiment of the present invention, the amount of the alkyl (meth)acrylate-based monomer may be 1 wt % to 30 wt %, 5 wt % to 20 wt %, or 10 wt % to 20 wt % based on the graft copolymer, and within this range, effects of excellent dispersibility of the graft copolymer may be achieved.

Meanwhile, according to an embodiment of the present invention, the alkyl (meth)acrylate-based monomer unit may be crosslinked from a crosslinking agent. Here, the crosslinking from the crosslinking agent may mean that the alkyl (meth)acrylate-based monomer units are crosslinked by the crosslinking agent by the crosslinking agent injected together when forming the alkyl (meth)acrylate-based monomer unit, or may mean that the rubbery polymer and the alkyl (meth)acrylate-based monomer units are crosslinked by the crosslinking agent by the crosslinking agent injected together when the alkyl (meth)acrylate-based monomer unit is graft polymerized into the rubbery polymer.

According to an embodiment of the present invention, the crosslinking agent may be a polyalkylene glycol di(meth)acrylate having a weight average molecular weight of 200 g/mol to 1,000 g/mol, 200 g/mol to 800 g/mol, or 300 g/mol to 500 g/mol. In a particular embodiment, the crosslinking agent may be a polyalkylene glycol diacrylate, more particularly, a polyethylene glycol diacrylate.

According to an embodiment of the present invention, in the alkyl (meth)acrylate-based monomer unit crosslinked from the crosslinking agent, the crosslinked moiety of the crosslinking agent may be represented by a crosslinkable connecting group, and in this case, the amount of the crosslinkable connecting group may be 0.01 wt % to 1.00 wt %, 0.05 wt % to 0.50 wt %, or 0.05 wt % to 0.20 wt % based on the graft copolymer, and within this range, crosslinking capacity on the alkyl (meth)acrylate-based monomer unit may be excellent, and improving effects of dispersibility as well as the mechanical properties of the graft copolymer may be achieved.

In addition, the graft copolymer according to the present invention may serve the improving effects of impact resistance and dispersibility in a resin composition simultaneously from the aromatic vinyl-based monomer unit having a weight average molecular weight of 20,000 g/mol to 100,000 g/mol.

According to an embodiment of the present invention, the aromatic vinyl-based monomer unit is for providing a graft copolymer with impact resistance and dispersibility, and an aromatic vinyl-based monomer forming the aromatic vinyl-based monomer unit may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene and 1-vinyl-5-hexylnaphthalene, particularly, styrene.

According to an embodiment of the present invention, the amount of the aromatic vinyl-based monomer unit may be 1 wt % to 30 wt %, 5 wt % to 25 wt %, or 10 wt % to 25 wt % based on the graft copolymer, and within this range, effects of excellent impact resistance and dispersibility of the graft copolymer may be achieved.

In addition, according to an embodiment of the present invention, the weight average molecular weight of the aromatic vinyl-based monomer unit may be 20,000 g/mol to 100,000 g/mol, 20,000 g/mol to 80,000 g/mol, or 45,000 g/mol to 60,000 g/mol, and within this range, effects of excellent impact resistance and dispersibility of the graft copolymer may be achieved.

Meanwhile, according to an embodiment of the present invention, the alkyl (meth)acrylate-based monomer unit may be grafted into the rubbery polymer, and the aromatic vinyl-based monomer unit may be grafted into the rubbery polymer and the alkyl (meth)acrylate-based monomer unit. That is, the alkyl (meth)acrylate-based monomer unit may be grafted into the rubbery polymer to be present as a first graft layer which forms a separate layer, and the aromatic vinyl-based monomer unit may be grafted into the first graft layer to be present as a second graft layer which forms a separate layer. In this case, the second graft layer may be present in a grafted type into the first graft layer as well as a directly grafted type into the rubber polymer together with the first graft layer. In addition, in a particular embodiment, the alkyl (meth0acrylate-based monomer unit may be included in the first graft layer which is formed while wrapping the rubbery polymer in a crosslinked state by a crosslinking agent, and the aromatic vinyl-based monomer unit may be included in the second graft layer which is formed while wrapping the rubber polymer and the first graft layer. The weight average molecular weight of the aromatic vinyl-based monomer unit may mean the weight average molecular weight of the second graft layer.

According to an embodiment of the present invention, the average particle diameter of the graft copolymer may be 200 nm to 250 nm, 200 nm to 240 nm, or 210 nm to 230 nm, and within this range, effects of excellent impact resistance and dispersibility of a resin composition including the graft copolymer as an impact reinforcing agent may be achieved.

The present invention provides a preparation method of a graft copolymer for preparing the graft copolymer. The method for preparing the graft copolymer includes: injecting and polymerizing a conjugated diene-based monomer and one or more compound units selected from the group consisting of compounds represented by Formula 1 below to prepare a rubbery polymer latex (S10); injecting an alkyl (meth)acrylate monomer and a crosslinking agent to the rubbery polymer latex prepared in step (S10) and polymerizing to prepare a preliminary graft copolymer latex (S20); and injecting an aromatic vinyl monomer to the preliminary graft copolymer prepared in step (S20) and polymerizing to prepare a graft copolymer latex (S30), wherein the compound represented by Formula 1 is injected in from 0.1 wt % to 5 wt % in step (S10) based on a total amount of the monomer, the compound represented by Formula 1 and the crosslinking agent, and step (S30) is performed by non-initiator polymerization by which a polymerization initiator is not injected.

[Formula 1]

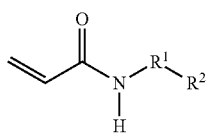

In Formula 1, the definition of each substituent is the same as described above.

According to an embodiment of the present invention, step (S10) is a step for preparing a rubbery polymer and may be a step of polymerizing a conjugated diene-based monomer with one or more compound units selected from the group consisting of the compounds represented by formula 1. Here, the conjugated diene-based monomer may be the same as the monomer for forming the conjugated diene-based monomer unit of the above-described rubbery polymer, and the one or more compound units selected from the group consisting of the compounds represented by formula 1 may be the same as the above-described one. In addition, the conjugated diene-based monomer may be injected in the same amount as the above-described amount of the conjugated diene-based monomer unit of the rubbery polymer, and the one or more compound units selected from the group consisting of the compounds represented by formula 1 may be injected in the same amount as the above-mentioned amount of the compound unit, and may be injected in 0.1 wt % to 5.0 wt %, 0.1 wt % to 3.0 wt %, or 0.5 wt % to 1.5 wt % based on the total amount of the monomer of the graft copolymer, the compound represented by Formula 1 and the crosslinking agent.

According to an embodiment of the present invention, step (S10) may be performed by emulsion polymerization, and accordingly, the rubbery polymer may be obtained in a rubbery polymer latex type including the rubbery polymer.

According to an embodiment of the present invention, step (S10) may be performed by radical polymerization using a peroxide-based, redox, or azo-based initiator, and the redox initiator may be, for example, one or more selected from the group consisting of t-butyl hydroperoxide, diisopropylbenzene hydroperoxide and cumene hydroperoxide. In this case, effects of providing stable polymerization environment may be obtained.

In addition, according to an embodiment of the present invention, in case of using the redox initiator, ferrous sulfate, sodium ethylenediaminetetraacetate and sodium formaldehyde sulfoxylate may be further included as the redox catalyst.

In addition, according to an embodiment of the present invention, an emulsifier used for emulsion polymerization in step (S10) may be one or more selected from the group consisting of an anionic emulsifier, a cationic emulsifier and a nonionic emulsifier, and particular embodiments may include one or more selected from the group consisting of alkylaryl sulfonate, alkali methyl alkylsulfate, a soap of fatty acid, an oleic acid alkali salt, a rosin acid alkali salt, a lauryl acid alkali salt, sodium diethylhexyl phosphate, a phosphonated polyoxyethylene alcohol and phosphonated polyoxyethylene phenol, and in this case, effects of providing stable polymerization environment may be obtained. The emulsifier may be injected in, for example, 5.0 parts by weight or less, 3.0 parts by weight or less, or 0.5 parts by weight to 2.5 parts by weight based on 100 parts by weight of the total amount of the monomer of the graft copolymer, the compound represented by Formula 1 and the crosslinking agent.

According to an embodiment of the present invention, the emulsion polymerization in step (S10) may be performed in an aqueous solvent, and the aqueous solvent may be ion exchange water.

According to an embodiment of the present invention, step (S20) is a step for preparing a preliminary graft copolymer, and may be a step for graft polymerizing an alkyl (meth)acrylate-based monomer into a rubbery polymer and performing crosslinking reaction by a crosslinking agent simultaneously. Here, the alkyl (meth)acrylate-based monomer may be the same as the above-described monomer for forming the alkyl (meth)acrylate-based monomer unit of the graft copolymer. In addition, the alkyl (meth)acrylate-based monomer may be injected in the same amount as the above-described amount of the alkyl (meth)acrylate-based monomer unit of the graft copolymer. In addition, here, the crosslinking agent may be the same as the above-described crosslinking agent. In addition, the crosslinking agent may be injected in the same amount as the above-described amount of the crosslinkable connecting group of the graft copolymer.

According to an embodiment of the present invention, the preliminary graft copolymer prepared in step (S20) may mean a graft copolymer in which a first graft layer is formed.

According to an embodiment of the present invention, the graft polymerization in step (S20) may be performed by emulsion polymerization, and accordingly, the preliminary graft copolymer may be obtained in a preliminary graft copolymer latex type including the preliminary graft copolymer.

According to an embodiment of the present invention, the graft polymerization in step (S20) may be performed by radical polymerization using a peroxide-based, redox, or azo-based initiator, and the redox initiator may be, for example, one or more selected from the group consisting of t-butyl hydroperoxide, diisopropylbenzene hydroperoxide and cumene hydroperoxide. In this case, effects of providing stable polymerization environment may be obtained.

In addition, according to an embodiment of the present invention, in the case of using the redox initiator, ferrous sulfate, sodium ethylenediaminetetraacetate and sodium formaldehyde sulfoxylate may be further included as the redox catalyst.

In addition, according to an embodiment of the present invention, an emulsifier used for emulsion polymerization in step (S20) may be one or more selected from the group consisting of an anionic emulsifier, a cationic emulsifier and a nonionic emulsifier, and particular embodiments may include one or more selected from the group consisting of alkylaryl sulfonate, alkali methyl alkylsulfate, a soap of fatty acid, an oleic acid alkali salt, a rosin acid alkali salt, a lauryl acid alkali salt, sodium diethylhexyl phosphate, a phosphonated polyoxyethylene alcohol and phosphonated polyoxyethylene phenol, and in this case, effects of providing stable polymerization environment may be obtained. The emulsifier may be injected in, for example, 1.0 part by weight or less, 0.5 parts by weight or less, or 0.01 parts by weight to 0.50 parts by weight based on 100 parts by weight of the total amount of the monomer of the graft copolymer, the compound represented by Formula 1 and the crosslinking agent.

According to an embodiment of the present invention, step (S30) is a step for preparing a graft copolymer and may be a step for graft polymerizing an aromatic vinyl-based monomer into the preliminary graft copolymer. Here, the aromatic vinyl-based monomer may be the same as the above-described monomer for forming the aromatic vinyl-based monomer unit of the graft copolymer. In addition, the aromatic vinyl-based monomer may be injected in the same amount as the above-described amount of the aromatic vinyl-based monomer unit of the graft copolymer.

According to an embodiment of the present invention, the graft copolymer prepared in step (S30) may mean a graft copolymer forming a first graft layer and a second graft layer with respect to a rubbery polymer.

According to an embodiment of the present invention, the graft polymerization in step (S30) may be performed by emulsion polymerization, and accordingly, the graft copolymer may be obtained in a graft copolymer latex type including the graft copolymer.

Meanwhile, according to an embodiment of the present invention, step (S30) may be performed by non-initiator polymerization, by which a polymerization initiator is not injected. The aromatic vinyl-based monomer unit formed by step (S30), i.e., the second graft layer is required to control the weight average molecular weight to 20,000 g/mol to 100,000 g/mol, 20,000 g/mol to 80,000 g/mol, or 45,000 g/mol to 60,000 g/mol to improve the impact resistance and dispersibility of the graft copolymer simultaneously. However, in case of performing step (S30) including an initiator, the aromatic vinyl-based monomer may separately form a homopolymer and may be a factor degrading the weight average molecular weight of the graft layer. Accordingly, the present invention may achieve effects of controlling the weight average molecular weight of the aromatic vinyl-based monomer, i.e., the second graft layer in the above-described range, by performing non-initiator polymerization of step (S30).

In addition, according to an embodiment of the present invention, step (S30) may be performed by further including sodium formaldehyde sulfoxylate as a reducing agent to provide stable polymerization environment.

In addition, according to an embodiment of the present invention, an emulsifier used for emulsion polymerization in step (S30) may be one or more selected from the group consisting of an anionic emulsifier, a cationic emulsifier and a nonionic emulsifier, and particular embodiments may include one or more selected from the group consisting of alkylaryl sulfonate, alkali methyl alkylsulfate, a soap of fatty acid, an oleic acid alkali salt, a rosin acid alkali salt, a lauryl acid alkali salt, sodium diethylhexyl phosphate, a phosphonated polyoxyethylene alcohol and phosphonated polyoxyethylene phenol, and in this case, effects of providing stable polymerization environment may be obtained. The emulsifier may be injected in, for example, 1.0 part by weight or less, 0.5 parts by weight or less, or 0.01 parts by weight to 0.50 parts by weight based on 100 parts by weight of the total amount of the monomer of the graft copolymer, the compound represented by Formula 1 and the crosslinking agent.

In addition, the present invention provides a resin composition including the graft copolymer and a vinyl chloride-based resin.

According to an embodiment of the present invention, the resin composition may be a vinyl chloride-based resin composition including the graft copolymer as an impact reinforcing agent.

According to an embodiment of the present invention, the resin composition may include the graft copolymer in 1 part by weight to 15 parts by weight, 3 parts by weight to 12 parts by weight, or 5 parts by weight to 10 parts by weight based on 100 parts by weight of the vinyl chloride-based resin.

According to an embodiment of the present invention, the resin composition may include an additive such as an antioxidant, a thermal stabilizer, a plasticizer, a processing aid, a coloring agent and a lubricant, well-known in the art in a typical amount, as necessary.

Hereinafter, embodiments of the present invention will be explained in detail so that a person skilled in the art could easily perform the present invention. However, the present invention may be accomplished in various other types and is not limited to the embodiments explained herein.

EXAMPLES

Example 1

Preparation of Rubbery Polymer Latex

To a 120 L, high-pressure polymerization reactor, based on total 100 parts by weight of 1,3-butadiene, divinylbenzene, a compound represented by Formula 1-1 below, methyl methacrylate, ethyl acrylate, polyethylene glycol diacrylate and styrene, 100 parts by weight of ion exchange water, 0.01 parts by weight of ferrous sulfate and 0.19 parts by weight of sodium ethylenediaminetetraacetate were injected, and the internal temperature of the reactor was kept to 50° C. under a nitrogen atmosphere. Then, to the reactor, 2.0 parts by weight of potassium oleate as an emulsifier, 73.5 parts by weight of 1,3-butadiene, 0.5 parts by weight of divinylbenzene, 1.0 part by weight of the compound represented by Formula 1-1 below and 0.9 parts by weight of sodium sulfate were injected, and at a point where the internal temperature of the reactor reached 50° C., 0.15 parts by weight of cumene hydroperoxide and 0.15 parts by weight of sodium formaldehyde sulfoxylate were continuously injected at the same time for 15 hours as polymerization initiators, and reaction was performed. After finishing the injection, and after 1 hour, 0.05 parts by weight of cumene hydroperoxide and 0.05 parts by weight of sodium formaldehyde sulfoxylate were injected in batch, and aging was performed for 1 hour to prepare a butadiene rubber latex. The total solid content of the butadiene rubber latex thus prepared was 38 wt %, and the average particle diameter of butadiene rubber particles was 200 nm.

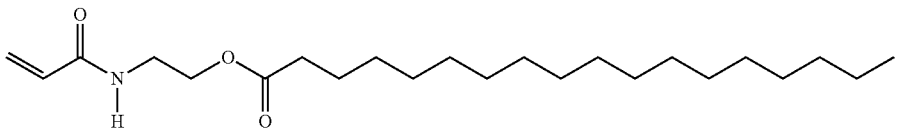

[Formula 1-1]

Preparation of Preliminary Graft Copolymer Latex

In the presence of the butadiene rubber latex thus prepared, the temperature of the reactor was kept to 55° C. Then, 0.1 parts by weight of potassium oleate as an emulsifier, 8.9 parts by weight of methyl methacrylate, 1.0 part by weight of ethyl acrylate, 0.1 parts by weight of polyethylene glycol diacrylate (weight average molecular weight of 400 g/mol), 0.1 parts by weight of cumene hydroperoxide as a polymerization initiator and 0.05 parts by weight of sodium formaldehyde sulfoxylate were injected in batch, and the reaction was performed. After finishing the injection and after 30 minutes, 0.01 parts by weight of cumene hydroperoxide and 0.01 parts by weight of sodium formaldehyde sulfoxylate were injected in batch, and aging was performed for 1 hour to prepare a preliminary graft copolymer latex.

Preparation of Graft Copolymer Latex

In the presence of the preliminary graft copolymer latex thus prepared, the temperature of the reactor was kept to 55° C. Then, 0.15 parts by weight of potassium oleate as an emulsifier, 15 parts by weight of styrene and 0.05 parts by weight of sodium formaldehyde sulfoxylate were injected in batch, and the reaction was performed. After finishing the injection and after 1 hour, 0.01 parts by weight of cumene hydroperoxide and 0.01 parts by weight of sodium formaldehyde sulfoxylate were injected in batch, and aging was performed for 1 hour to prepare a graft copolymer latex. A polymerization conversion ratio of the graft copolymer latex thus prepared was 98%, the total solid content was 40 wt %, and the average particle diameter of graft copolymer particles was 220 nm.

The polymerization conversion ratio was calculated by the ratio of the solid weight of the graft copolymer obtained with respect to the solid weight of the rubbery polymer and the monomer injected.

Preparation of Graft Copolymer Dry Powder

To 100 parts by weight (based on the solid content) of the graft copolymer latex thus obtained, 1 part by weight of an aqueous sulfuric acid was injected in batch for agglomeration to obtain a slurry, and the slurry was washed with ion exchange water three times to remove by-products. Then, filtering was performed to remove the washed water, and drying was performed using a fluidized bed dryer at 80° C. for 2 hours to obtain a graft copolymer dry powder.

Example 2

The same method as in Example 1 was performed except for injecting the equivalent amount of a compound represented by Formula 1-2 below instead of the compound represented by Formula 1-1 during preparing a rubbery polymer latex, in Example 1.

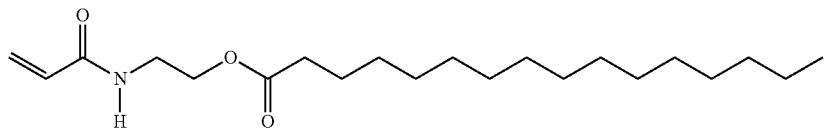

[Formula 1-2]

Example 3

The same method as in Example 1 was performed except for mixing 0.4 parts by weight of the compound represented by Formula 1-1, 0.4 parts by weight of a compound represented by Formula 1-2 below, and 0.2 parts by weight of a compound represented by Formula 1-3 and injecting total 1.0 parts by weight of the mixture instead of 1.0 part by weight of the compound represented by Formula 1-1 during preparing a rubbery polymer latex, in Example 1.

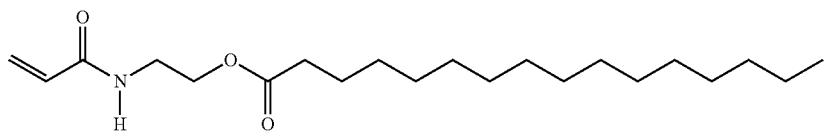

[Formula 1-2]

-continued

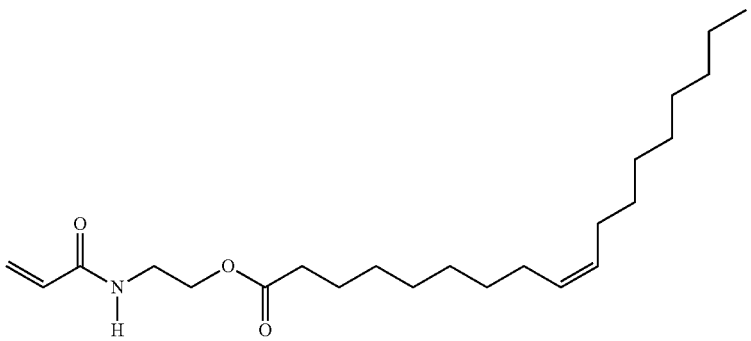

[Formula 1-3]

Comparative Example 1

The same method as in Example 1 was performed except for injecting 1,3-butadiene in 74.5 parts by weight instead of 73.5 parts by weight and not injecting the compound represented by Formula 1-1 during preparing a rubbery polymer latex, in Example 1.

Comparative Example 2

The same method as in Example 1 was performed except for injecting 0.15 parts by weight of cumene hydroperoxide together with the emulsifier, styrene and sodium formaldehyde sulfoxylate in batch and performing the reaction during preparing a graft copolymer latex, in Example 1.

Comparative Example 3

The same method as in Example 1 was performed except for keeping the temperature of the reactor to 30° C. instead of 55° C., injecting cumene hydroperoxide and sodium formaldehyde sulfoxylate in batch, and aging for 3 hours instead of 1 hour during preparing a graft copolymer latex, in Example 1.

Comparative Example 4

The same method as in Example 1 was performed except for injecting 1,3-butadiene in 74.45 parts by weight instead of 73.5 parts by weight and injecting the compound represented by Formula 1-1 in 0.05 parts by weight instead of 1.0 part by weight during preparing a rubbery polymer latex, in Example 1.

Comparative Example 5

The same method as in Example 1 was performed except for injecting 1,3-butadiene in 69.0 parts by weight instead of 73.5 parts by weight and injecting the compound represented by Formula 1-1 in 5.5 parts by weight instead of 1.0 part by weight during preparing a rubbery polymer latex, in Example 1.

Comparative Example 6

The same method as in Example 1 was performed except for injecting methyl methacrylate in 9.0 parts by weight instead of 8.9 parts by weight and not injecting polyethylene glycol diacrylate (weight average molecular weight of 400 g/mol) during preparing a rubbery polymer latex, in Example 1.

EXPERIMENTAL EXAMPLES

Experimental Example 1

With respect to each of the graft copolymers prepared in Examples 1 to 3 and Comparative Examples 1 to 6, the gel content and swelling index of butadiene rubber, the average particle diameter of rubbery polymer particles, the average particle diameter of graft copolymer particles and the weight average molecular weight of the aromatic vinyl-based monomer unit (second graft layer) of the graft copolymer were measured by methods below and are shown in Table 1.

Gel content and swelling index: about 10 g of each of the butadiene rubber latexes prepared in Examples 1 to 3 and Comparative Example 1 to 6 was put in a glass chalet and dried in a hot air drier of 65° C. for 12 hours, and about 0.5 g of a film was immersed in toluene for 24 hours. Insoluble parts were collected, the gel content was calculated according to Mathematical Formula 1 below, and the swelling index was calculated according to Mathematical Formula 2 below.

Gel content (wt %)=(weight of insoluble dried film/weight of injected film)×100  [Mathematical Formula 1]

Swelling index=weight of swelled film/weight of dried film  [Mathematical Formula 2]

Average particle diameter (D50, nm): each of butadiene rubber latexes and graft copolymer latexes prepared in Examples 1 to 3 and Comparative Examples 1 to 6 were diluted in distilled water in a concentration of 200 ppm or less, and an average particle diameter (D50) of butadiene rubber particles dispersed in a butadiene rubber latex and an average particle diameter (D50) of graft copolymer particles dispersed in a graft copolymer latex were measured according to Intensity Gaussian Distribution using a Dynamic Laser Light Scattering method by using NICOMP 380 (PSS Co.) at room temperature (23° C.).

Weight average molecular weight (Mw, g/mol) of aromatic vinyl-based monomer unit: each of the graft copolymer dry powders prepared in Examples 1 to 3 and Comparative Examples 1 to 6 was dissolved in tetrahydrofuran (THF) into a concentration of 0.25 wt %, and a weight average molecular weight was measured by gel permeation chromatography (GPC) under conditions below.

Column: two columns of PLgel Olexis (Polymer laboratories Co.) and one column of PLgel mixed-C (Polymer Laboratories Co.) were used in combination
Solvent: THE
Flow rate: 1.0 ml/min
Column temperature: 40° C.
Detector: Differential Refractive Index Detector (RI)
Standard material: polystyrene (PS)

set of a rotary test specimen was formed with 16 pieces, and by using a rotary impact strength tester, impact was applied to each specimen while rotating at high speed in 950 rpm to 1,050 rpm for 30 seconds at 24° C. According to the status, the specimens were classified into five grades as below, and according to the average of scores according to the grade classified in the 1 set of the specimen, nondestructive impact efficiency was

TABLE 1

| | Division | | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Rubbery polymer | BD[1] | (parts by weight) | 73.5 | 73.5 | 73.5 | 74.5 | 73.5 | 73.5 | 74.45 | 69.0 | 73.5 |
| | DVB[2] | (parts by weight) | 0.5 | 0.5 | 0.5 | 0.5 | 0.5 | 0.5 | 0.5 | 0.5 | 0.5 |
| | C1-1[3] | (parts by weight) | 1.0 | — | 0.4 | — | 1.0 | 1.0 | 0.05 | 5.5 | 1.0 |
| | C1-2[4] | (parts by weight) | — | 1.0 | 0.4 | — | — | — | — | — | — |
| | C1-3[5] | (parts by weight) | — | — | 0.2 | — | — | — | — | — | — |
| | Gel content | (wt %) | 92 | 93 | 92 | 98 | 92 | 93 | 92 | 83 | 94 |
| | Swelling index | | 12 | 11 | 13 | 6 | 12 | 12 | 12 | 20 | 13 |
| | Average particle diameter | (nm) | 200 | 205 | 195 | 203 | 200 | 203 | 199 | 200 | 199 |
| Preliminary graft copolymer | MMA[6] | (parts by weight) | 8.9 | 8.9 | 8.9 | 8.9 | 8.9 | 8.9 | 8.9 | 8.9 | 9.0 |
| | EA[7] | (parts by weight) | 1.0 | 1.0 | 1.0 | 1.0 | 1.0 | 1.0 | 1.0 | 1.0 | 1.0 |
| | PEGDA[8] | (parts by weight) | 0.1 | 0.1 | 0.1 | 0.1 | 0.1 | 0.1 | 0.1 | 0.1 | — |
| Graft copolymer | SM[9] | (parts by weight) | 15.0 | 15.0 | 15.0 | 15.0 | 15.0 | 15.0 | 15.0 | 15.0 | 15.0 |
| | Mw | g/mol | 50,000 | 45,000 | 60,000 | 40,000 | 10,000 | 110,000 | 50,000 | 40,000 | 35,000 |
| | Usage of polymerization initiator or not | | X | X | X | X | O | X | X | X | X |
| | Average particle diameter | (nm) | 220 | 225 | 215 | 222 | 219 | 230 | 225 | 220 | 220 |

[1] BD: 1,3-butadiene
[2] DVB: divinylbenzene
[3] C1-1: compound represented by Formula 1-1
[4] C1-2: compound represented by Formula 1-2
[5] C1-3: compound represented by Formula 1-3
[6] MMA: methyl methacrylate
[7] EA: ethyl acrylate
[8] PEGDA: polyethylene glycol diacrylate with a weight average molecular weight of 400 g/mol
[9] SM: styrene Experimental Example 2

100.0 parts by weight of a vinyl chloride resin (LG Chem, Ltd., product name: 080S), 1.5 parts by weight of a thermal stabilizer (tin stearate), 0.5 parts by weight of a processing aid (LG Chem, Ltd., product name: PA-912), 0.5 parts by weight of a lubricant (product name: G16) and 7.0 parts by weight of each of the graft copolymer dry powders prepared in Examples 1 to 3 and Comparative Examples 1 to 6 were injected into a Henschel Mixer, and the temperature was raised to 110° C. in 1,500 rpm, and then cooled to 50° C. to prepare a resin composition. Impact strength and fish-eye properties were measured by methods below and are shown in Table 2 below.

Impact strength (rotary impact strength, %): the resin composition thus prepared was processed using a roll-mill of 195° C. in 25 rpm for 3 minutes to form a specimen with a thickness of 0.5 mm, and the specimen was cut into a size of 3 cm (length)×14 cm (width). 1 calculated. Higher calculated nondestructive impact efficiency means excellent impact strength, and 50% or more means very excellent.

Grade A (100 points): no breakage and crack (100% preserved)
Grade B (75 points): no breakage but generation of crack
Grade C (50 points): generation of breakage and crack (greater than 50% preserved)
Grade D (25 points): generation of breakage and crack (50% or less preserved)
Grade E (0 points): generation of breakage and crack (not preserved)

Fish-eye properties (non-dispersed melt (fish-eye) properties, five-point method): after preparing a resin composition, a film with a thickness of 0.2 mm was extruded from the resin composition thus prepared at a cylinder temperature of 180° C. and in a screw rate of 30 rpm using a single screw extruder of 20 mm, equipped with a T-die, and the number of fish-eye (dispersed melt) present in a region of 4 cm (length)×4 cm (width) on the surface of the film was checked with the naked dye. The score was shown by a five-point method based on the standard below.
5 points: 0 to 10 bumps
4 points: 11 to 20 bumps
3 points: 21 to 30 bumps
2 points: 31 to 40 bumps
1 point: 41 to 50 bumps

TABLE 2

| Division | | Example | | | Comparative Example | | | | | |
|---|---|---|---|---|---|---|---|---|---|---|
| | | 1 | 2 | 3 | 1 | 2 | 3 | 4 | 5 | 6 |
| Impact strength | (%) | 75 | 74 | 78 | 35 | 42 | 38 | 39 | 30 | 55 |
| Fish-eye properties | Five-point method | 5 | 5 | 5 | 2 | 1 | 2 | 1 | 1 | 1 |

As shown in Tables 1 and 2, it could be confirmed that the resin composition including the graft copolymer prepared according to the present invention as an impact reinforcing agent showed high impact strength, excellent impact resistance, excellent fish-eye properties, and excellent dispersibility of the graft copolymer.

On the contrary, in case of Comparative Example 1 in which the compound represented by Formula 1 was not injected during preparing a rubbery polymer, it could be confirmed that the gel content was high, and the swelling index was low. Accordingly, it could be confirmed that the degree of crosslinking of a rubbery polymer was deteriorated, and impact resistance was deteriorated, of course, as well as dispersibility.

In addition, in case of Comparative Example 2 in which an initiator was injected during performing graft polymerization of a styrene monomer during preparing a graft copolymer, it could be confirmed that the weight average molecular weight of a styrene monomer unit, i.e., a second graft layer was deteriorated due to the injection of the initiator, and accordingly, both impact resistance and dispersibility were deteriorated.

In addition, in case of Comparative Example 3 in which a polymerization temperature was reduced and an aging time was increased during performing graft polymerization of a styrene monomer during preparing a graft copolymer, it could be confirmed that the weight average molecular weight of the second graft layer was excessively increased, and accordingly, both impact resistance and dispersibility were deteriorated.

In addition, in case of Comparative Example 4 in which the compound represented by Formula 1 was injected but in a small amount during preparing a rubbery polymer, it could be confirmed that though the degree of crosslinking and gel content were shown controlled through the injection of even a small amount of the compound represented by Formula 1 during preparing a rubbery polymer, both impact resistance and dispersibility were rather deteriorated. From this, it could be confirmed that in case of preparing a graft copolymer including a rubbery polymer prepared by injecting the compound represented by Formula 1 and applying the same as an impact reinforcing agent in practice, at least 0.1 wt % or more of the one or more compound units selected from the group consisting of the compounds represented by Formula 1 with respect to the graft copolymer is required to secure impact resistance and dispersibility.

In addition, in case of Comparative Example 5 in which though the compound represented by Formula 1 was injected but in an excessive amount, it could be confirmed that the gel content was rather deteriorated, the swelling index was increased, and accordingly, impact resistance as well as dispersibility was degraded due to the deterioration of the degree of crosslinking of a rubbery polymer.

In addition, in case of Comparative Example 6 in which a crosslinking agent was not injected during preparing a preliminary graft copolymer, it could be confirmed that the crosslinking of methyl methacrylate and ethyl acrylate was not carried out, and impact resistance and dispersibility were deteriorated.

From the results as described above, it could be confirmed that in case of applying the graft copolymer according to the present invention as an impact reinforcing agent in a vinyl chloride-based resin, the impact resistance of a resin composition was excellent, and fish-eye properties were improved according to the improvement of dispersibility.

The invention claimed is:

1. A graft copolymer comprising a rubbery polymer,
    wherein the rubbery polymer comprises a conjugated diene-based monomer unit, and one or more compound units represented by the following Formula 1,
    wherein the graft copolymer comprises an alkyl (meth) acrylate-based monomer unit and an aromatic vinyl-based monomer unit,
    the content of the one or more compound units represented by Formula 1 is from 0.1 wt % to 5.0 wt % with respect to the graft copolymer,
    the alkyl (meth)acrylate-based monomer unit is crosslinked from a crosslinking agent, and
    the aromatic vinyl-based monomer unit has a weight average molecular weight from 20,000 g/mol to 100,000 g/mol:

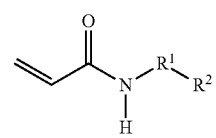

[Formula 1]

wherein in Formula 1,
$R^1$ is an alkylene group comprising 1 to 10 carbon atoms, and
$R^2$ is a saturated or unsaturated fatty acid ester group comprising 10 to 20 carbon atoms.

2. The graft copolymer according to claim 1, wherein $R^2$ is represented by the following Formula 2:

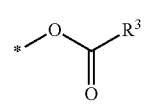

[Formula 2]

wherein in Formula 2,
$R^3$ is a saturated or unsaturated monovalent hydrocarbon group comprising 9 to 19 carbon atoms.

3. The graft copolymer according to claim 1, wherein $R^2$ is a stearate group, a palmitate group, an oleate group or a linoleate group.

4. The graft copolymer according to claim 1, wherein the rubbery polymer comprises a crosslinkable monomer unit.

5. The graft copolymer according to claim 1, wherein, when immersed in toluene for 24 hours, the rubbery polymer has a gel content of 85 wt % to 98 wt % and a swelling index of 7 to 16.

6. The graft copolymer according to claim 1, wherein the alkyl (meth)acrylate-based monomer unit comprises one or more monomer units selected from the group consisting of a methyl (meth)acrylate monomer unit and an alkyl (meth)acrylate monomer unit of 2 to 12 carbon atoms.

7. The graft copolymer according to claim 1, wherein the crosslinking agent is a polyalkylene glycol di(meth)acrylate having a weight average molecular weight of 200 g/mol to 1,000 g/mol.

8. The graft copolymer according to claim 1, wherein the alkyl (meth)acrylate-based monomer unit is grafted into the rubbery polymer, and the aromatic vinyl-based monomer unit is grafted into the rubbery polymer and the alkyl (meth)acrylate-based monomer unit.

9. A method for preparing a graft copolymer, the method comprising:

step S10: injecting and polymerizing a conjugated diene-based monomer and one or more compounds represented by the following Formula 1 to prepare a rubbery polymer latex;

step S20: injecting an alkyl (meth)acrylate monomer and a crosslinking agent to the rubbery polymer latex prepared in step S10 and polymerizing to prepare a preliminary graft copolymer latex; and step S30: injecting an aromatic vinyl monomer to the preliminary graft copolymer latex prepared in step S20 and polymerizing to prepare a graft copolymer latex, wherein the compound represented by Formula 1 is injected in an amount from 0.1 wt % to 5 wt % in step S10 based on a total amount of all monomers, the one or more compounds represented by Formula 1 and the crosslinking agent, and step S30 is performed by non-initiator polymerization by which a polymerization initiator is not injected:

[Formula 1]

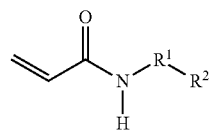

wherein in Formula 1, $R^1$ is an alkylene group of 1 to 10 carbon atoms, and $R^2$ is a saturated or unsaturated fatty acid ester group of 10 to 20 carbon atoms.

10. A resin composition comprising the graft copolymer according to claim 1, and a vinyl chloride-based resin.

* * * * *